United States Patent [19]

Mez

[11] 4,410,206
[45] Oct. 18, 1983

[54] FLANGE CONNECTION FOR RECTANGULAR AIR-CONDITIONING DUCTS

[75] Inventor: Georg Mez, Reutlingen, Fed. Rep. of Germany

[73] Assignee: Mez-Technik A.G., Zurich, Switzerland

[21] Appl. No.: 262,199

[22] Filed: May 11, 1981

[51] Int. Cl.³ ............................................. F16L 23/00
[52] U.S. Cl. ...................................... 285/405; 285/424
[58] Field of Search ................... 285/405 (U.S. only), 285/412 (U.S. only), 424 (U.S. only), 363

[56] References Cited

U.S. PATENT DOCUMENTS

| | | | |
|---|---|---|---|
| 3,630,549 | 12/1971 | Grimm | 285/424 X |
| 3,687,168 | 8/1972 | Sherman et al. | 285/424 X |
| 3,712,650 | 1/1973 | Mez | 285/424 X |
| 3,923,326 | 12/1975 | Mez | 285/424 X |
| 4,123,094 | 10/1978 | Smitka | 285/424 X |
| 4,142,743 | 3/1979 | McGowen et al. | 285/424 X |
| 4,218,079 | 8/1980 | Arnoldt | 285/424 X |
| 4,244,609 | 1/1981 | Smitka | 285/424 X |
| 4,283,080 | 8/1981 | Nakajima | 285/405 |
| 4,288,115 | 9/1981 | Sullivan | 285/424 X |

Primary Examiner—Thomas F. Callaghan

[57] ABSTRACT

A flange connection for the ends of two pieces of square ducting has eight pieces of open-sided box girder, four of which are slipped out and fixed onto each of the two ends forming frames thereon. The two frames are then bolted together.

For producing the desired sealing force along any two paired of the two frames, anglepieces at the frames' corners have nosepieces running out against each other so that, on screwing up the bolts tight, the middle part of the two girders in a pair are levered and bowed out towards each other for producing said sealing force. Each of the bolts is placed through a hole running through and have two legs on each anglepiece and through two wall parts of each of said box girders.

8 Claims, 7 Drawing Figures

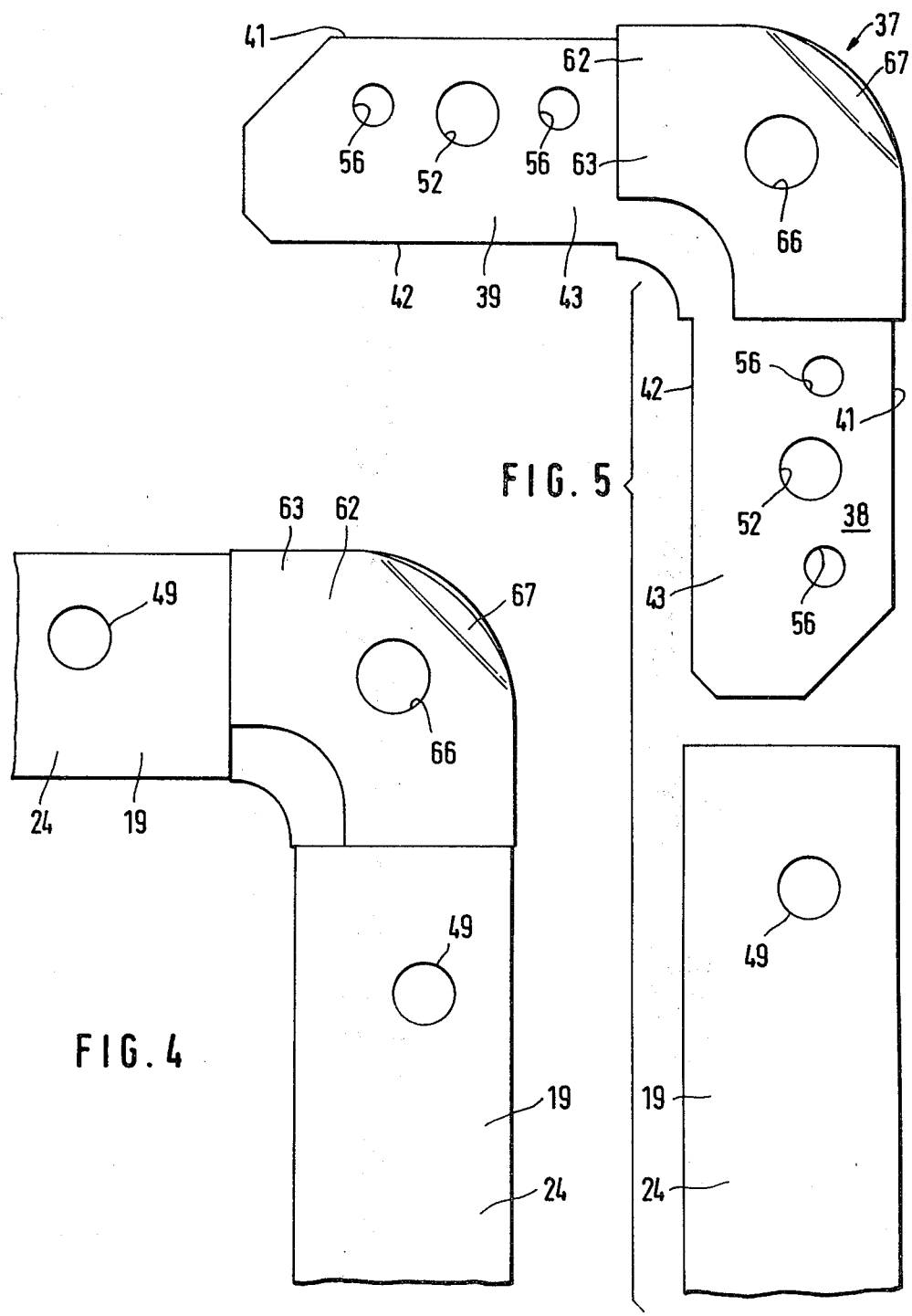

FLANGE CONNECTION FOR RECTANGULAR AIR-CONDITIONING DUCTS

BACKGROUND OF THE INVENTION

The present invention is with respect to a flange connection for rectangular air-conditioning ducting having eight metal sheet frame arms in the form of open-edge box girder, which may be slipped onto the edges of one piece of rectangular ducting, and with metal anglepieces, some millimeters in thickness and each having two legs joined together by a middle plate, the legs being designed to be slipped into pieces of a box girder next to the anglepiece, the middle plate having an outer thicker corner part for spacing and generally placed on a line halving the angle between the legs of the anglepiece, the anglepieces and the box girders being joined together by fixing parts which may, for examples, be bolts.

A flange connection on these lines are to be seen in German Pat. No. 2,258,680 or in the parallel U.S. Pat. No. 3,923,326. Such designs have come into wide use in the trade.

However, for large-size air-conditioning ducting or ducting run with a high inside pressure, there is a general need for pressing together the frame arms (box girder) of two lengths of ducting with a greater force, because of this decreasing the losses caused by leaks. Furthermore, the ducting is frequently hangingly supported using specially designed structures. Such ducting is sometimes very heavy and frequently so large in size that a complete assembly team may go along inside it using special-purpose vehicles. In this respect, the forces produced by the effect of gravity have to be taken up by the legs of the anglepieces or elbows which are at right angles to each other. For reasons of rationalization and because such a connection gives a strong join, the lengths of box girders are spot-welded to the legs of the anglepieces. Frequently, however, holes may be produced in the legs of the anglepieces, into which the outer wall of a frame arm is embossed or dented, see FIGS. 1 and 2 of U.S. Pat. No. 3,923,326, such connections being acted upon by strong forces.

GENERAL OUTLINE OF THE INVENTION

One purpose of the present invention is that of designing a flange connection of the sort noted which, without making any further training of assembly workers necessary or making use of more complex parts, is responsible for a very much higher pressing force acting on the inner walls of the frame arms. A further purpose of the invention is that of designing a flange connection which is more or less certain of being able to take up the loads noted acting on such air-conditioning ducting.

In the present invention, for effecting this purpose and other purposes, the fixing parts take effect at positions which are symmetrical with respect to the line halving the angle between the legs of each anglepiece, each of the fixing parts forcing together a sandwich structure made up of an outer wall part of one piece of box girder, a leg of the anglepiece within the box girder, an inner wall of the same piece of box girder, a piece of inner wall of a further piece of box girder, an anglepiece leg placed within the second piece of box girder and an outer wall of the second piece of box girder. With this design, it is possible, if desired, to make the angle- or elbow pieces even thinner than has been normal in the trade so far while nevertheless producing a better effect. Furthermore, there is now no play between the legs of the anglepieces and the inner walls and outer walls. Furthermore, there is a distribution of the forces over a very much larger area, because a spot weld or a hole-and-dent join as used in the art so far is limited to a certain size, that is to say, putting it better, to a certain small size. With the design of the present invention, a flange connection of the sort so far used may still be used. By making use of fixing parts such as bolts in the invention, assembly work is in many cases more readily possible, because a worker is able to get at the work better. While so far it has been normal to make use of anglepieces with a thickness of 3 to 6 mm, with the present invention a thickness of 1.5 to 3 mm is all that is needed.

As part of a further development of the invention, there is a hole running through all the layers forced together by the fixing parts, the fixing parts being headed bolts placed in the holes. The bolts may be screw-threaded and used with nuts. This makes it possible for bolts as used in the prior art and tools to be used in the present invention.

The through-holes may be placed about halfway along each of the legs, this being the best position from the strength of materials angle. Furthermore, the holes may be placed about halfway across the breadth of that part, at which the outer wall of the box girder is rested on the anglepiece leg, this being the best position for the bolt or the like to take effect on the outer wall of the box girder.

As a further possible development of the invention, the anglepiece leg may, in addition, have dent guiding holes, whose diameter is, however, smaller than that of the through-hole, a line joining the content of the dent guiding holes being spaced from the middles of the through-hole. This makes it possible for the prior art system with dent guiding holes to be used while nevertheless not making the legs less strong to any important degree. Furthermore, it is less likely for the parts of the system to be mixed up because of a worker not being able to see which hole is designed for which fixing part. As a further development of the invention, the line joining the centers of the dent guiding holes is spaced from the center of the through-holes, this making for an even smaller decrease in strength of the structure.

On the other hand, it is furthermore possible to have only one single through-hole in each part.

LIST OF FIGURES

On account will now be given of a preferred working example of the invention using the figures.

FIG. 4 is a view of the structure of FIG. 2 as seen from the other side, without the left hand piece of ducting as in FIG. 1.

FIG. 5 is a view on the same lines as FIG. 4 before slipping in the one leg of the anglepiece into the box girder.

DETAILED ACCOUNT OF WORKING EXAMPLE OF MY INVENTION

Figure 1:
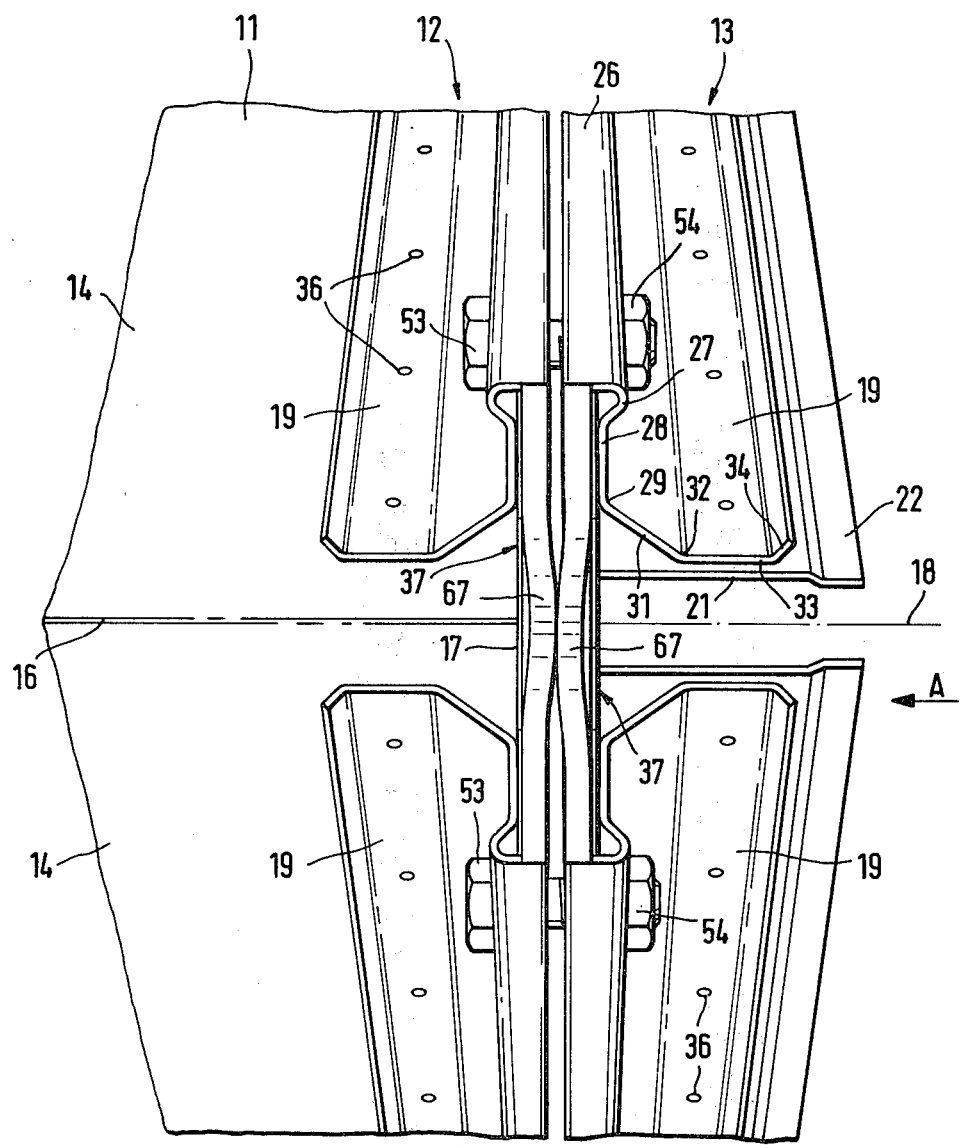
FIG. 1 is a view looking downwards at an angle of 45° onto the corner part of a flange connection of the present invention, without the right hand piece of ducting of an air-conditioning system.

One length of ducting 11 of an air-conditioning system is joined up by way of its own flange connection 12 and a further flange connection 13 with the further length of ducting, which, however, is not to be seen in FIG. 1. Each length of ducting or duct 11 has four flat walls 14, placed at a right angle to each other and having right-angled corners 16. Each wall 14 has an end face 17, all such end faces 17 being in a single plane which is normal to the plane of FIG. 1, that is to say in a plane normal to the lengthways axis 18 of the ducting generally.

Figure 7:
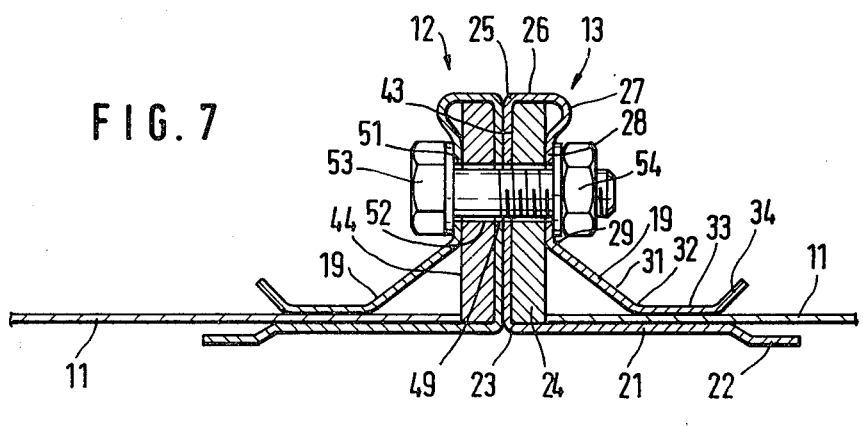
FIG. 7 is a section on the line 7—7 of FIG. 3.

All frame arms 19 are the same as each other and are made up of 1.7 mm thick metal sheet. They have an inner wall 21, which is parallel to the lengthways axis 18 and only has a guide-in lip 22 at its free end, which, by way of a small step, is taken back some distance away from the plane of the inner wall 21 itself. Inner wall 21 is right-angled at 23 (see FIG. 7), it then running outwardly as a sealing wall 24, which is normal to lengthways axis 18, it stretching as far as a point 25 at which it is right-angled back again parallel to inner wall 21 to take the form of a short cross-running wall 26 running into a curved part 27, which as well is short, it being joined up with an outer wall 28 which is normal to lengthways axis 18 but is very much shorter than sealing wall 24. At point 29, outer wall 28 is bent through 45° to take the form of a support or buttressing wall 31, running at 45° and which is bent through 45° at 32 to be joined up with a further short opposite wall 33 running parallel to lengthways axis 18. It has a guide-in lip 34. The edge part of the length of ducting 11 is slipped in between the opposite wall 33 and the inner wall 21 and then fixed in position by normal spot welds 36 which are produced after the putting together of the flange connection 12, 13 on the end of the length of ducting.

Figure 2:
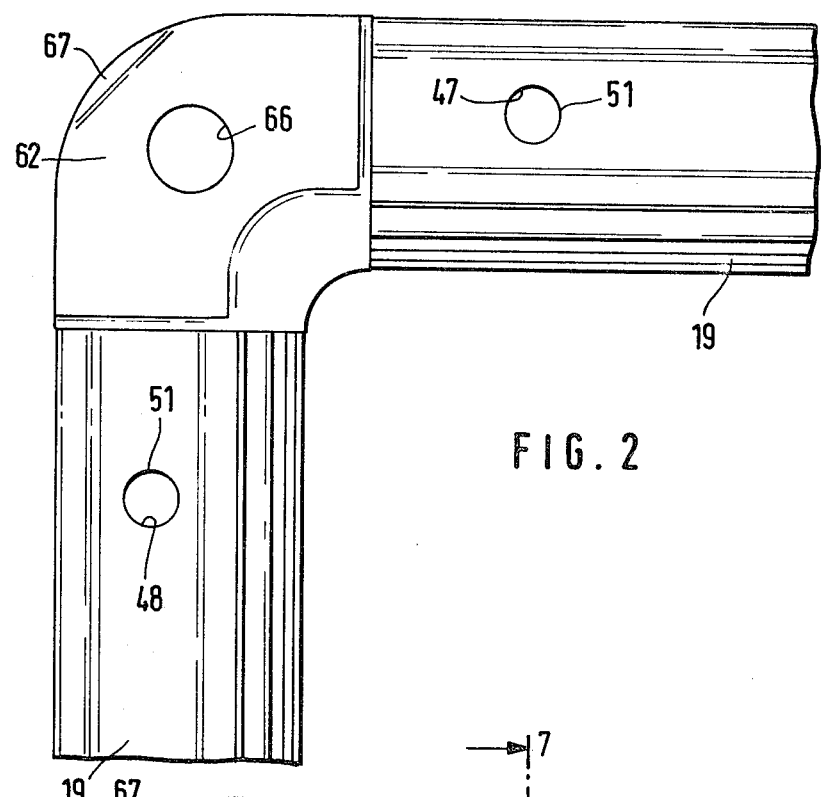
FIG. 2 is a view looking in the direction of the arrow A in FIG. 1 but without bolts and nuts.
Figure 3:
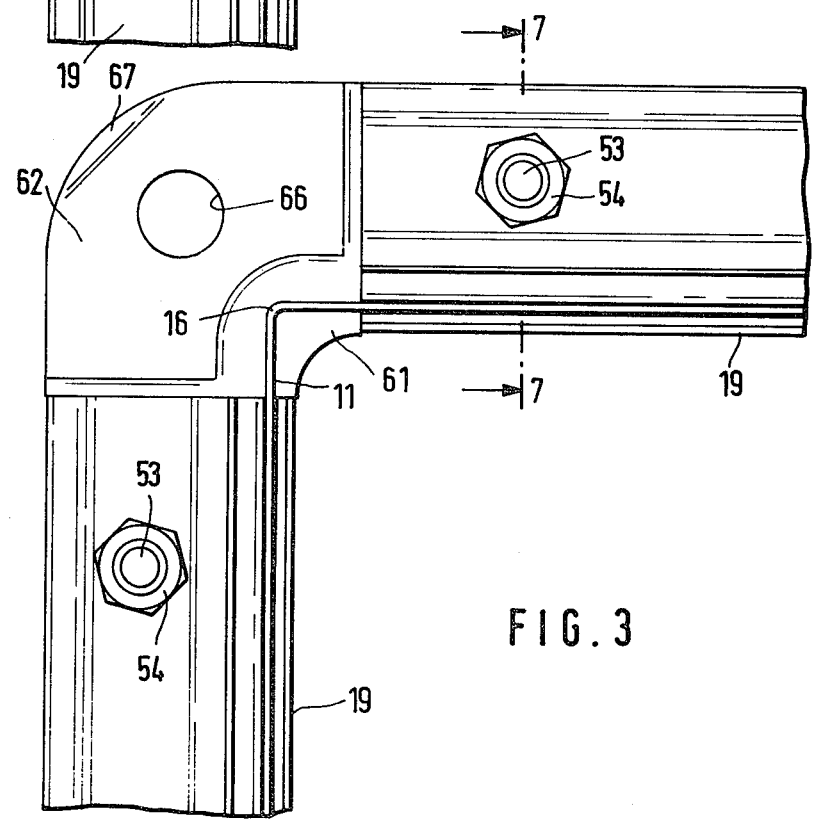
FIG. 3 is a view looking in the direction of arrow A in FIG. 1 but with the ducting in position.

An anglepiece 37 (see FIG. 5) is made up of 5 mm metal sheet and has two legs 38, 39. Each anglepiece has outer end faces 41 on its legs and inner end faces 42 on its legs, end faces 41 being normal to each other, this furthermore being true of end faces 42. On each leg, the end faces 41 and 42 are parallel to each other. End faces 41 are placed resting against the inside of the cross-running wall 26, the end faces 42 resting against the inside of inner wall 21. The sealing wall 24 has its inner face resting against the back face 43 of the legs 38 and 39 in question. The front face 44 of each leg 38, 39 has a part 46, which is cross-hatched in FIG. 6, resting against the inner face of outer wall 28. Parallel to the lengthways axis 18 there are two through-holes 47, 48 (FIG. 2), running through all three layers, that is to say (see FIG. 7) the sealing wall 24, the leg 38 or 39 and the outer wall 28. Each frame arm 19 has, at each end, a hole 49 (FIG. 4) running through the sealing wall 24 and a further hole 51 in the outer wall 28 and in line with hole 49, the holes being in the part between the curved part 27 and the 45° bend 29. Each leg 38, 39 has a hole 52 in line with holes 49 and 51. The sealing wall 24 is designed for smoothly resting against the back face 43 with the outer wall 28 lying smoothly and fully against the front face 44. Screw-threaded bolts 53 are placed in through-holes 47 and 48, the heads of such bolts resting on the outside against an outer wall 28 and with the stems of the bolts running through through-holes 47 and 48 and having nuts 54 screwed up on their male threads.

On each side of each hole 52 (see FIG. 5 or FIG. 6) and with their centers somewhat nearer the end faces 41, there are holes 56 with a smaller diameter than the diameter of holes 52, such holes 56 being used for guidingly taking up dents in the outer wall 28. Such dents are, however, not presented in the figures. In fact, the present working example of the invention may be made without such holes 56 and without any such dents.

Frame arms 19 are slipped onto the legs 38, 39 as far as stop-edges 57, 58 which make certain, together with the special positioning of the holes 49, 51 and 52—which are produced in the maker's works before assembly—that the through-holes 47 and 48 are, in fact, kept fully open on assembly, that is to say without such holes being partly covered over by parts of the system not being exactly lined up.

Figure 6:
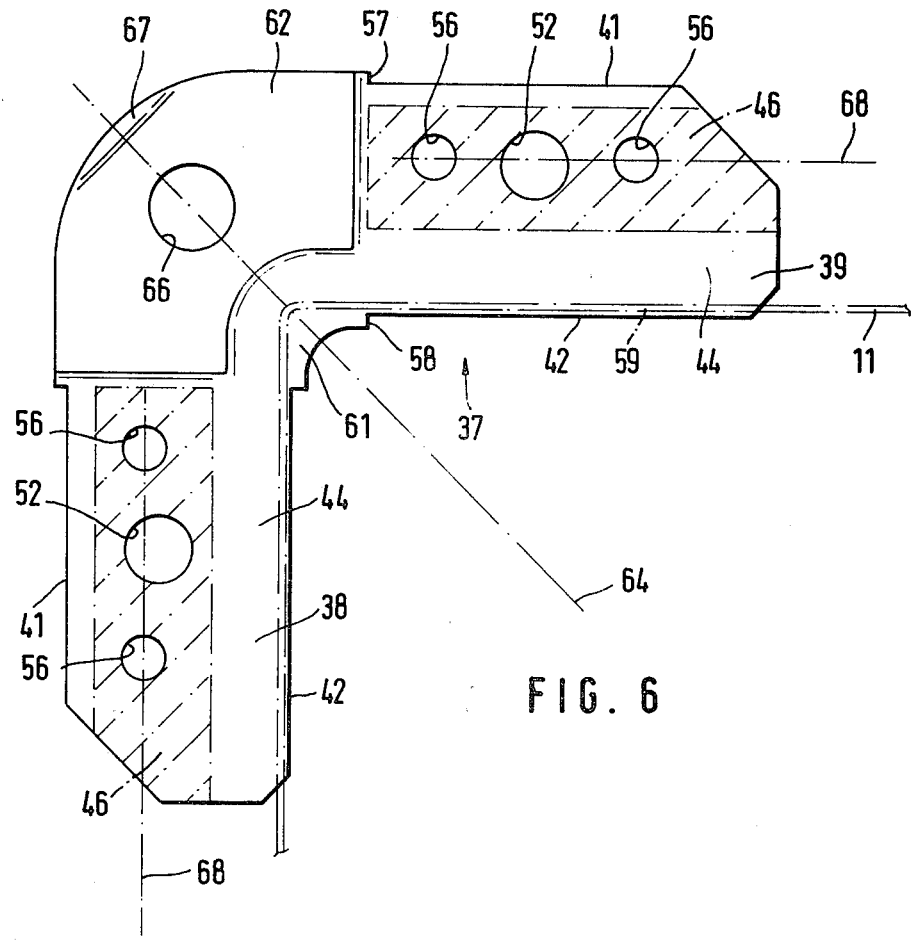
FIG. 6 is a view of the back side of an anglepiece as in FIG. 5, that is to say as seen in the direction of the arrow A of FIG. 1.

In FIG. 6, the line 59 of the end face 17 of the ducting has been marked to make it clear that the walls 14 are resting on the cornerpiece 37. If the end faces 42 were to be produced somewhat further outwards by a distance equal to the thickness of a wall 14, the walls 14 as well would be able to be rested against the inner side of sealing wall near angle 23 past the anglepieces 37.

Because furthermore the stop-edges 58 are present and in the present working example the walls 14 are designed running up against the anglepieces 37, one radiussed corner 61 is moved inwards somewhat. In each case, two stop-edges 57 and 58 will be in line with each other in an upright or horizontal direction.

Outside the radiussed corner 61 over an angle of about 90° a middle plate 62 is bent downwards and outwards flatwise and normal to the lengthways axis 18 as in FIG. 6, such bending being generally equal to the thickness of the sheet metal of a frame arm 19. Then the back face 63 of middle plate 62 will be in line with the outer face of the sealing wall 24. Symmetrically with respect to a line 64 halving the angle between the legs, that is to say at 45° to each of the legs, there is an outer radiussed corner 67, which is bent downwards out of the plane of FIG. 6 or upwards out of the plane of FIG. 5 (see furthermore FIG. 1) by about 1.5 mm. Because, as will be seen from FIG. 1, two radiussed corners 67 are placed one on top of the other, there will be a spacing of about 3 mm between one sealing wall 24 and the next one before the bolts are done up tight.

When, on assembly, nuts 54 are done up tight, it will not only be a case of the legs 38, 39 being strongly joined to the frame arms, but furthermore of the frame arms' being strongly forced together in the middle part as well, that is to say halfway along the length between two anglepieces of the same flange connection, such force being greater than with prior art systems.

I claim:

1. In a flange connection for rectangular sheet metal air-conditioning ducts having
    sheet metal frame members in the form of open-sided box girders having inner and outer walls, which members may be slipped onto the free edges at the ends of the sheet metal of such air-conditioning duct,
    metal anglepieces several millimeters thick, each having two legs with an angle therebetween, each of said legs being designed to be slipped into said box girders, each said anglepiece furthermore having a middle plate, generally placed in one plane but for an outer cornerpart of the middle plate, which is formed out of this plane for use as a spacer, the cornerpart being generally on a line having said angle, and fixing parts for grippingly joining said anglepieces together, the improvement wherein said fixing parts take effect on each of said angle piece legs at position which are symmetrical with respect to said line having said angle in each case, each of said fixing parts forcing together a sandwich structure made up of:

an outer wall of a first one of said box girders, one leg of one of said angle pieces, an inner wall of said first box girder, an inner wall of a second one of said box girders, a leg of a second angle piece and an outer wall of said second box girder, and said walls and said angle piece legs each have through-holes running there through and said fixing parts take the form of headed bolts slipped through said through-holes.

2. The invention as claimed in claim 1, wherein the fixing parts are screw-threaded bolts with nuts.

3. The invention as claimed in claim 1, wherein each through-hole is placed generally halfway along each leg.

4. The invention as claimed in claim 1, wherein the outer wall of the box girder is rested against the anglepiece leg at a predetermined position and said through-hole is about halfway across the breadth of the leg and in said position.

5. The invention as claimed in claim 1, wherein said legs of said anglepieces have dent-guiding holes, whose diameters are smaller than that of the through-holes, a line joining said dent-guiding holes being spaced from the centers of the through holes.

6. The invention as claimed in claim 5, wherein the line joining the centers of the dent-guiding holes is spaced from the centers of the through-holes.

7. The invention as claimed in claim 1, wherein each leg has a single through-hole.

8. In a flange connection joining the ends of two lengths of rectangular-cross-section sheet metal duct of an air-conditioning system, each duct length end having four sides, lengths of box girders into which each of said four sides is slipped and fixed, which are joined together pairwise with one girder in each pair being fixed on one end of a length of duct and the other being fixed opposite thereto on the other length of duct, and right angled anglepieces each having two legs which are taken up in the ends of said box girders, the improvement in which each box girder, at the ends thereof which receive the legs, comprises:

(a) two generally parallel first and second wall parts placed on opposite sides of said duct end wall and fixed thereto, said first wall part being within said duct and being longer than said second wall part, (b) a third wall part generally bent to run outwards from said first wall part and generally normal thereto, (c) a fourth wall part bent to run out normally from said third wall part so as to be generally parallel to said first wall, and said fourth and said first wall parts being on the same side of said third wall part, (d) a fifth wall part which is curved, running from said fourth wall part in a direction generally towards said first wall part, (e) a sixth wall part running from said fifth wall part towards said first wall part and parallel to said third wall part, and (f) a seventh buttressing wall part running at a slope from said sixth wall part to said second wall part, and in which said legs of said anglepiece are generally rectangular in cross-section and are positioned between said third and said sixth wall parts, two such box girder and angelpiece structures being placed sealingly against each other with the outer faces of said third walls resting against each other, said box girders having gripping systems, forcing the same together and taking effect on said sixth wall part, said anglepieces having spacers therebetween, said gripping systems being spaced from said spacers and taking effect on each of said angle piece legs and producing a levering and bending effect on said box girders, whereby the middle part of said box girders in each pair, between the ends of the box girders, are fulcrumed about said spacers by said gripping systems.

* * * * *